United States Patent [19]

Kondo

[11] Patent Number: 4,953,023
[45] Date of Patent: Aug. 28, 1990

[54] A CODING APPARATUS FOR ENCODING AND COMPRESSING VIDEO DATA

[75] Inventor: Tetsujiro Kondo, Kanagawa, Japan
[73] Assignee: Sony Corporation, Tokyo, Japan
[21] Appl. No.: 407,753
[22] Filed: Sep. 15, 1989

[30] Foreign Application Priority Data

| Sep. 29, 1988 | [JP] | Japan | 63-245228 |
| Sep. 29, 1988 | [JP] | Japan | 63-245229 |
| Sep. 29, 1988 | [JP] | Japan | 63-245230 |

[51] Int. Cl.$^5$ .................................... H04H 7/12
[52] U.S. Cl. ........................... 358/135; 358/136
[58] Field of Search ................... 358/133, 135, 136

[56] References Cited

U.S. PATENT DOCUMENTS

| Re. 32,291 | 11/1986 | Nakagome et al. | |
| 3,502,815 | 3/1970 | Young et al. | |
| 4,307,420 | 12/1981 | Ninomiya et al. | 358/105 X |
| 4,442,454 | 4/1984 | Powell | 358/135 X |
| 4,701,807 | 10/1987 | Ogino | |
| 4,710,822 | 12/1987 | Matsunawa | |
| 4,802,006 | 1/1989 | Iinuma et al. | 358/135 |
| 4,809,067 | 2/1989 | Kikuchi et al. | 358/135 |

FOREIGN PATENT DOCUMENTS

| 0142767 | 5/1985 | European Pat. Off. |
| 0310021 | 4/1989 | European Pat. Off. |

Primary Examiner—James J. Groody
Assistant Examiner—Victor R. Kostak
Attorney, Agent, or Firm—Alvin Sinderbrand

[57] ABSTRACT

A difference between an original digital value of a picture element to be encoded and an original digital value of a spatially adjacent picture element of the picture element is determined by a detecting circuit. The video data of the spatially adjacent picture element is decoded to generate a decoded value by a local decoder. A compressed encoded video data of the picture is generated wherein a difference between a decoded value of the compressed encoded video data and the decoded value is closest to the difference.

5 Claims, 8 Drawing Sheets (PRIOR ART)
Fig. 1

A CODING APPARATUS FOR ENCODING AND COMPRESSING VIDEO DATA

BACKGROUND OF THE INVENTION

1. Field of the Invention

This invention relates to a highly efficient coding apparatus of image data which is applied to compress and encode the image data.

2. Description of the Prior Art

Various kinds of encoding systems utilizing the correlation of image signals have been proposed for reducing the number of bits in each pixel or picture element (sample) of the digitized image data. As disclosed in the specification of Japanese Patent Laid Open Publication (JP,A) No. 144989/1986, the applicant of the present invention has proposed a highly efficient coding apparatus in which a dynamic range equal to a difference between a maximum value and minimum value of a plurality of pixels included in a two-dimensional block, is obtained and the encoding adapted to the dynamic range is executed. On the other hand, as shown in the specification of Japanese Patent Laid Open Publication (JP,A) No. 92626/1987, there has been proposed a highly efficient coding apparatus in which the encoding adapted to the dynamic range is executed with respect to a three-dimensional block which is formed by pixels in a plurality of areas each belonging to a plurality of frames. Further, as disclosed in the specification of Japanese Patent Laid Open Publication (JP,A) No. 128621/1985, there is been proposed a variable length encoding method in which the number of bits changes in accordance with the dynamic range so that the maximum distortion, which occurs upon digitization, becomes constant.

The above encoding methods adapted to the dynamic range (hereinafter, ADRCs) relate to highly efficient coding methods whereby, the number of bits per pixel is reduced by using the fact that images have a strong correlation in a small area (block), which is obtained by dividing one picture plane. That is, the difference between the minimum or maximum value in the block and the level of each pixel becomes smaller than the original level. This difference can be digitized by a number of bits which is smaller than the number of original bits.

The present invention can be applied to the digitization of the level standardized by the minimum or maximum value in the foregoing ADRC. However, this invention is not limited to ADRC, but can be also applied to a digitizing circuit for expressing a digital image signal by a predetermined number of bits in a manner similar to the ADRC.

Figures 1, 9:
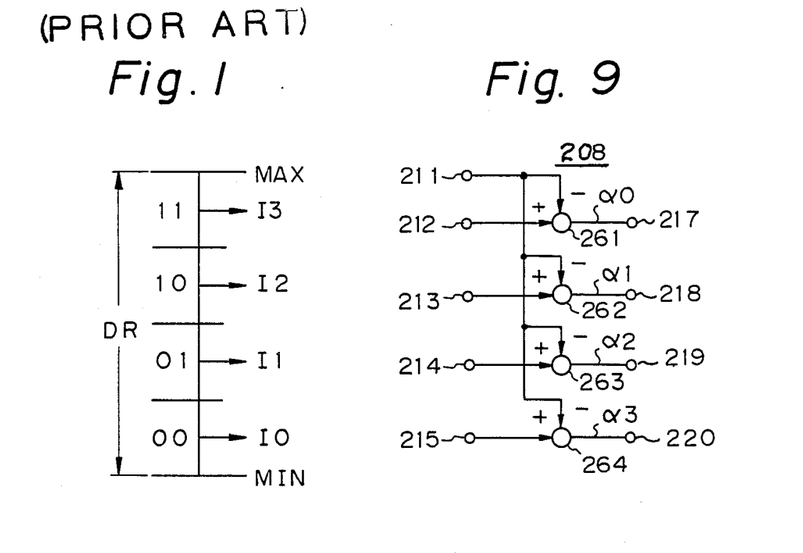
FIG. 1 is a schematic diagram for use in explanation of a principle of a digitization in ADRC according to the prior art.
FIG. 9 is a block diagram showing the details of a distortion detection circuit in the third embodiment of the present invention shown in FIG. 8.

As shown in FIG. 1, in performing the digitization of two bits in ADRC, a dynamic range DR in a block as, which is a difference between the maximum value MAX and minimum value MIN, is uniformly divided into for level ranges. The value of the pixel from which the minimum value MIN was eliminated is expressed by a two bit digitization code corresponding to the respective level ranges. On the decoding side, one of the central decoding representative level, I0 to I3, in each level range is decoded from the dynamic range DR and the digitization code, and the minimum value MIN is added to the decoded value, so that the pixel data in the block is reconstructed.

Figure 2:
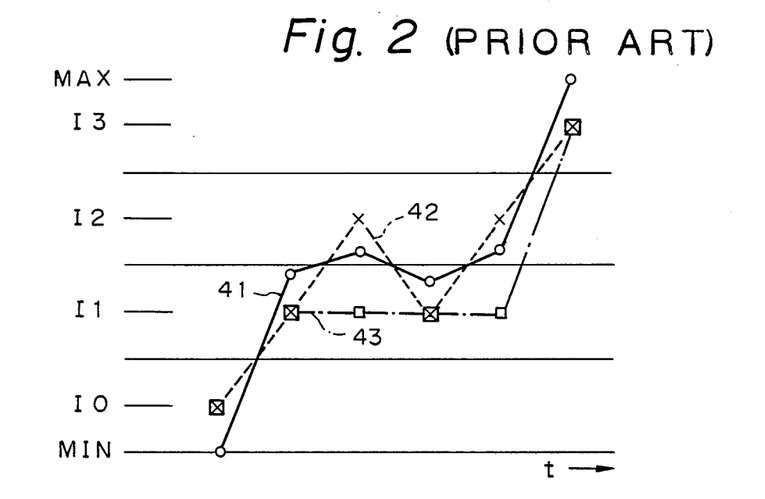
FIGS. 2 and 3 are schematic diagrams for use in explanation of a characteristic of a conventional digitizing circuit according to the prior art.

FIG. 2 shows an example of the digitization performed in ADRC in which one block of a one dimensional ADRC is constructed by six pixels which are continuous in the horizontal direction. Data indicated by O denotes true values of the pixels in the block. A horizontal change, due to digitization, is indicated by a solid line 41. In the case where the encoding was executed by two bits ADRC, reconstruction levels indicated by X are obtained on the decoding side and a corresponding change in signal as shown by a broken line 42 occurs in the reconstructed image.

In the conventional digitization, the level of the original pixel is replaced with the nearest decoding representative level in order to minimize the digitization error and to improve the S/N ratio. However, there is a case where a visually conspicuous deterioration occurs in the reconstructed image even if the image is quantitatively good. For example, the original smooth horizontal change 41, as shown in FIG. 2, results in the rough change 42 after the reconstruction, that is, visually conspicuous noises are generated in the reconstructed image. These noises cause the snow noises, which occur in a received television image in a weak electric field, to be made fine and jitter-like. The occurence of such a problem results from the fact that when people recognize an image, they are sensitive to differentiating characteristics of the image.

Figure 3:
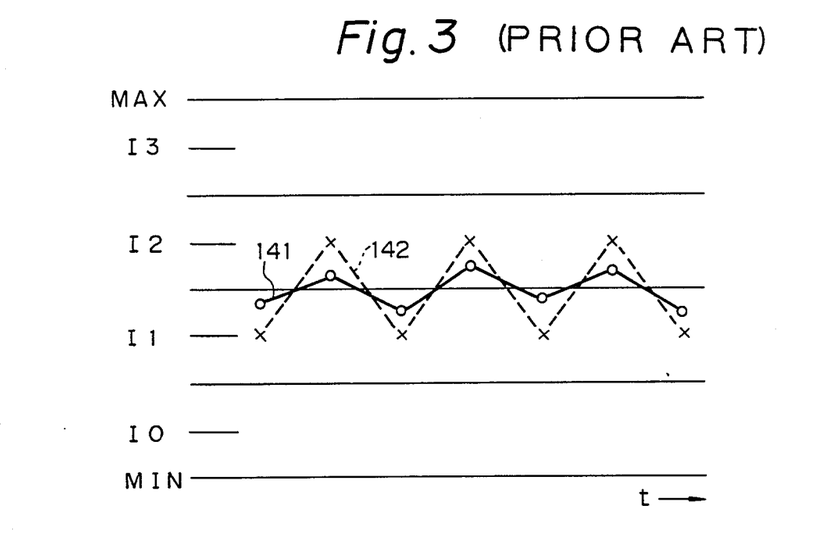

FIG. 3 shows another example of digitization performed in ADRC, that is, shows a time change of pixels at positions belonging to six frames which are continuous in the time direction and spatially correspond to those frames. For simplicity, it is assured that each block in which the six pixels are included has the same maximum value MAX and the same minimum value MIN. The data shown by O denotes the true values of the pixels. The change in the time direction is shown by a solid line 141. In the case were the encoding was executed by two bit ADRC, the reconstruction level are shown by X which are obtained on the decoding side and a change in the signal as shown by a broken line 142 occurs in the reconstructed image.

In the example shown in FIG. 3, the original smooth change 141 in the time direction results in the rough change 142 after the reconstruction. Visually conspicuous noises are generated in the reconstructed image as in the example shown in FIG. 2.

OBJECTS AND SUMMARY OF THE INVENTION

Accordingly, it is an object of this invention to provide a highly efficient coding device which avoids the above-mentioned disadvantages of the prior art.

It is, therefore, an object of the present invention to provide a highly efficient coding apparatus which can preserve spatial change in the original image signal even if quantitative errors increase and visually improve the picture quality of the reconstructed image.

It is another object of the invention to provide a highly efficient coding apparatus which can preserve time dependent changes in the original image signal and visually improve the picture quality of the reconstructed image.

It is still another object of the invention to provide a highly efficient coding apparatus which is preferably adapted to characteristics such as pattern, movement amount, and the like of an image and in which the picture quality of the reconstructed image can be visually improved.

According to an aspect of the present invention, there is provided a highly efficient coding apparatus for encoding original digital video data having n bits for each picture element into compressed video data having a number of bits less than n for each picture element, comprising:

first detecting means for detecting a first difference between an original digital value of a first picture element to be encoded and an original digital value of a spatially adjacent picture element of the first picture element, first local decoding means for decoding encoded video data of the spatially adjacent picture element to generate a first decoded value, and generating means for generating compressed encoded video data of the first picture element wherein a difference between a decoded value of the compressed encoded video data and the first decoded value is closest to the first difference.

the generating means includes second local decoding means for decoding all compressed encoded data and for generating decoded values, first subtracting means for subtracting the first decoded value from each of the decoded values to generate first subtracted values, second subtracting means for subtracting each of the first subtracted values from the first difference to generate second subtracted values, minimum detecting means supplied with the second subtracted values for detecting a minimum value thereof and code selecting means for selecting one of compressed code data corresponding to the detected minimum value.

According to another aspect of the invention, there is provided a highly efficient encoding apparatus for coding original digital video data having n bits for each picture element into compressed video data having a number of bits less than n for each picture element, comprising:

first detecting means for detecting a first difference between an original digital value of a first picture element to be encoded and an original digital value of a temporally adjacent and spatially identical picture element of the first picture element, first local decoding means for decoding encoded video data of the temporally adjacent and spatially identical picture element to generate a first decoded value, and generating means for generating compressed encoded video data of first picture element wherein a difference between a decoded value of the compressed encoded video data and the first decoded value is closest to the first difference, the generating means includes second local decoding means for decoding all compressed encoded data and for generating decoded values, first subtracting means for subtracting the first decoded value from each of the decoded values to generate first subtracted values, second subtracting means for subtracting each of the first subtracted values from the first difference to generate second subtracted values, minimum detecting means supplied with the second subtracted values for detecting a minimum value thereof and code selecting means for selecting one of compressed code data corresponding to the detected minimum value.

According to still another aspect of the invention, there is provided a highly efficient encoding apparatus for coding original digital video data having n bits for each picture element into compressed video data having a number of bits less than n for each picture element, comprising:

first local decoding means for decoding all compressed code data and for generating decoded values for a first picture element to be encoded, first detecting means for detecting first differences between an original digital value of the first picture element and the each of the decoded values, second detecting means for detecting second differences between a difference value of the original digital value of the first picture element and an original digital value of a spatially adjacent picture element of the first picture element and difference values of the decoded values and a decoded value of an encoded data of the spatially adjacent picture element, third detecting means for detecting third differences between a difference value of the original digital value of the first picture element and an original digital value of temporally adjacent and spatially identical picture element of the first picture element and difference values of the decoded values and a decoded value of an encoded data of the temporally adjacent and spatially adjacent picture element, weighting and adding means for multiplying first, second and third weighting coefficients by the first, second and third differences, respectively, and for adding corresponding ones of the multiplied first, second and third differences together to generate added values, minimum detecting means supplied with the added values for detecting a minimum value thereof, and code selecting means for selecting one of compressed code data corresponding to the minimum value.

The above, and other, objects, features and advantages of the present invention will become readily apparent from the following detailed description thereof which is to be read in connection with the accompanying drawings.

DESCRIPTION OF THE PREFERRED EMBODIMENTS

A first embodiment of the present invention will be described hereinbelow with reference to the drawings.

Figures 4, 4A:
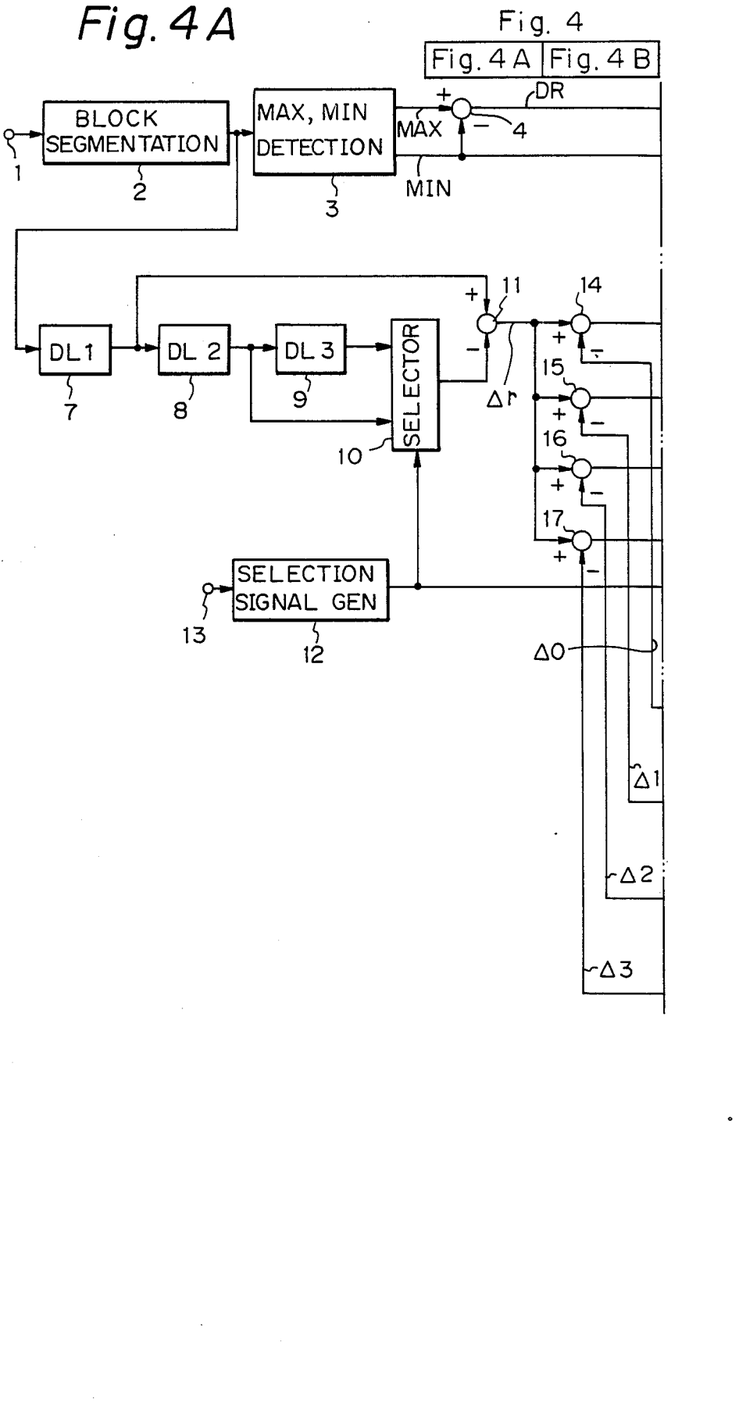
FIGS. 4A and 4B illustrate (FIG. 4) a block diagram showing a first embodiment of the present invention.
Figure 4B:
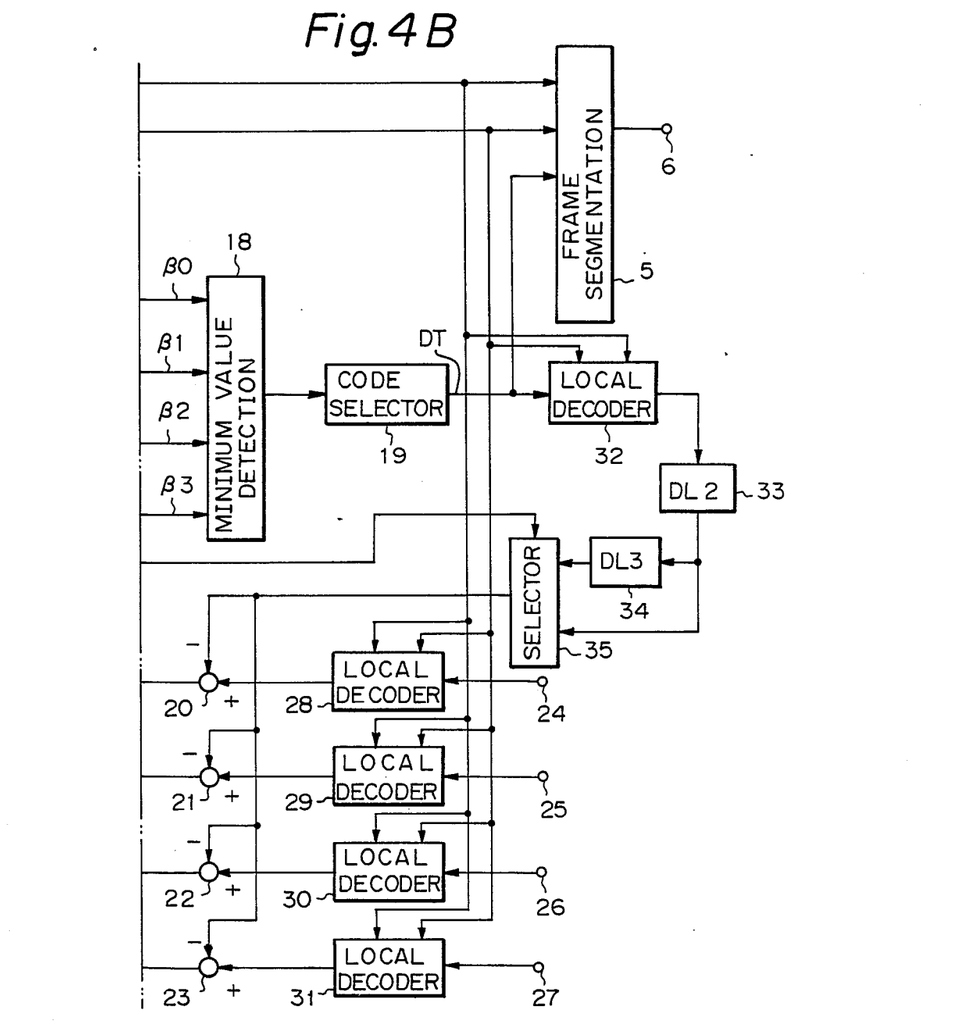
Figures 5, 6:
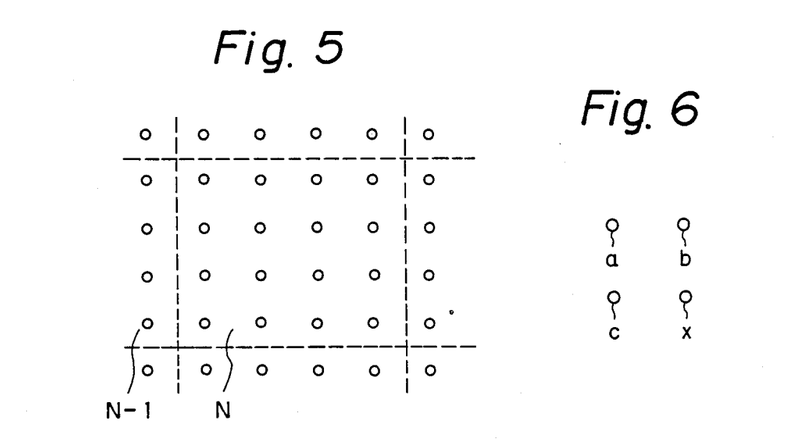
FIGS. 5 and 6 are schematic diagrams for use in explanation of a first embodiment of the present invention.

In FIGS. 4A and 4B, a digital video signal in which, for instance, one pixel (one sample) is digitized to eight bits and is supplied to an input terminal shown by reference numeral 1. The input digital video signal data order is changed from a scanning order to a block order by a block segmentation circuit 2. For instance, a picture plane of one frame is divided into small areas and blocks (4×4=16 pixels) as shown in FIG. 5. In FIG. 5, N−1 denotes a preceding block and N indicates an objective block which is to be encoded. In the block, the data in the top left edge pixel as viewed toward the diagram is first transmitted. The data in the three pixels arranged in a horizontal direction are then transmitted. Data on the second line are similarly transmitted. Finally, the data in the lowest pixel at the right edge is transmitted.

An output signal from the block segmentation circuit 2 is supplied to a maximum value and minimum value detecting circuit 3. The maximum value MAX and the minimum value MIN of the pixels included in each block are detected. The maximum value MAX and the minimum value MIN are supplied to a subtracting circuit 4, in which a dynamic range DR, which is the difference between them, is calculated. The dynamic range DR and the minimum value MIN are supplied to a frame segmentation circuit 5 in which the dynamic range DR, the minimum value MIN, and a digitization code DT, which will be explained hereinlater, are converted into a signal format having a frame construction and if necessary are subjected to an error correction encoding process. Transmission data is obtained at an output terminal 6 of the frame segmentation circuit 5.

The output signal of the block segmentation circuit 2 is supplied to one of the input terminals of a selector 10 through delay circuits 7, 8 and 9. The output signal of the delay circuit 8 is supplied to the other input terminal of the selector 10. The output signal of the delay circuit 7 and the output signal of the selector 10 are supplied to a subtracting circuit 1, wherein a difference Δr in the horizontal direction of the original pixel data (true value) is calculated. Assuming that the true value of the objective pixel is set to x1 and the true value of the pixel which preceded the objective pixel by one sampling period is set to x0 then, (Δr=x1−x0).

Delay circuit 7 delays the signal an amount DL1 which corresponds to the time necessary for detecting the maximum value and the minimum value. Delay circuit 8 delays the signal an amount DL2 which corresponds to the interval in the horizontal direction between pixels, that is, one sampling period. Therefore, the difference Δr, which is the difference in the horizontal direction between the pixel data which preceded the objective pixel by one sample and the objective pixel data to be encoded, is generated from the subtracting circuit 11.

Consider the case of the pixels at the left edge column in the block. Since the data of the preceding pixel does not exist in the block, it is necessary to form the difference by using the pixel data from at the right edge in the preceding block N-1. When the pixels at the left edge in the block are supplied to the subtracting circuit 11, the selector 10 selects the pixel data from the right edge of the preceding block which is obtained from the delay circuit 9. Delay circuit 9 delays the signal an amount DL3 which is set to one block period minus three sampling periods. The selector 10 is controlled by a selection signal from a selection signal generating circuit 12. Clock signals that is, sampling clock and a block clock, from a terminal 13 are supplied to the selector signal generating circuit 12 and the selection signal from controlling selector 10, as mentioned above, is formed.

The difference Δr between the true values of the image data obtained form the subtracting circuit 11 is supplied to subtracting circuits 14, 15, 16 and 17. The output signals $\beta 0$, $\beta 1$, $\beta 2$ and $\beta 3$ from subtracting circuits 14, 15, 16 and 17, respectively, are supplied to a minimum value detecting circuit 18 in which the minimum output signal is detected. A detection signal from minimum value detecting circuit 18 is supplied to a code selecting circuit 19 and a two bit digitization code DT is generated therein. The digitization code DT is transmitted to frame segmentation circuit 5. In the code selecting circuit 19, one of the two-bit digitization codes (00), (01), (10) and (11), in which correspond to decoded representative levels I0, I1, I2 and I3, respectively, is selected.

The selecting operation of the code selecting circuit 19 is as follows.

When $\beta 0$ is minimum, (00) is selected as the digitization code DT.

When $\beta 1$ is minimum, (01) is selected as the digitization code DT.

When $\beta 2$ is minimum, (10) is selected as the digitization code DT.

When $\beta 3$ is minimum, (11) is selected as the digitization code DT.

Signals Δ0, Δ1, Δ2 and Δ3 are supplied from subtracting circuits 20, 21, 22 and 23 to subtracting circuits 14, 15, 16 and 17, respectively. The signals Δ0, Δ1, Δ2 and Δ3 correspond to the differences between the decoding level (X0) of the pixel preceding the objective pixel and the four decoding representative levels and indicate the predictive change amount, respectively. The subtracting circuits 14, 15, 16 and 17 and the minimum value detecting circuits 18 detect among the signals Δ0, Δ1, Δ2 and Δ3, the signals closest to the difference Δr in the horizontal direction of the true value of the image data. In other words, the digitization code DT corresponding to the decoding representative level with the change closest to the signal change in the horizontal direction of the original image signal is selected with respect to the objective pixel.

Decoding representative levels (MIN+I0), (MIN+I1), (MIN+I2) and (MIN+I3) formed by local decoders 28, 29, 30 and 31 are supplied to the subtracting circuits 20, 21, 22, and 23, respectively. In order to generate these decoding representative levels, the dynamic range DR and the minimum value MIN are supplied to the local decoders 28, 29, 30 and 31. Also, two-bit digitization codes (00), (01), (10) and (11) are supplied from terminals 24, 25, 26 and 27, respectively. The local decoders 28, 29, 30 and 31 and the local decoder 32 are comprised of ROMs to which the dynamic range DR and digitization code DT are supplied as addresses as shown in FIG. 4B. The minimum value MIN is added to the data read out of the ROMs.

The decoding level X0 of the pixel preceding the objective pixel is formed by the local decoder 32, delay circuits 33 and 34, and a selector 35. The digitization code DT from the code selecting circuit 19 is supplied to the local decoder 32 so as to generate a decoding level of the objective pixel. The decoding level is supplied to an input terminal of the selector 35 through the delay circuit 33, which has a delay amount DL2 equal to one sampling period. An output signal of the delay circuit 33 is supplied to the other input terminal of the selector 35 through the delay circuit 34, which has a delay amount DL3 equal to one block period minus three sampling periods. The selector 35 is controlled by the selection signal from the selection signal generating circuit 12 in a manner similar to the foregoing selector 10.

The delay circuits 33 and 34 and selector 35 generate the decoding level X0 for the pixel X0 which precedes the objective pixel x1 in a manner similar to the foregoing delay circuits 8 and 9 and selector 10. The decoding level is supplied to the subtracting circuits 20, 21, 22 and 23. Therefore, the signals $\Delta 0$ to $\Delta 3$, which are generated from the subtracting circuits 20, 21, 22 and 23, respectively, correspond to the predictive differences between the four decoding representative levels and the decoding level X0 of the pixel which precedes the objective pixel as will be shown below.

$$\Delta 0 = (I0 + MIN) - X0$$

$$\Delta 1 = (I1 + MIN) - X0$$

$$\Delta 2 = (I2 + MIN) - X0$$

$$\Delta 3 = (I3 + MIN) - X0$$

In the subtracting circuits 14, 15, 16 and 17, the following output signals are formed.

$$\beta 0 = \Delta r - \Delta 0$$

$$\beta 1 = \Delta r - \Delta 1$$

$$\beta 2 = \Delta r - \Delta 2$$

$$\beta 3 = \Delta r - \Delta 3$$

Since the minimum signal among $\beta 0$, $\beta 1$, $\beta 2$ and $\beta 3$ detected by the minimum value detecting circuit 18, the digitization code, in which the predictive change amount is closest to the true value of the change amount $\Delta r$, is selected by the code selecting circuit 19.

It is also possible in the above embodiment to execute the digitization in which two-dimensional changes in the horizontal direction, vertical direction, oblique direction, and the like are accurately expressed without limiting the differences to changes in the horizontal direction. For instance, as shown in FIG. 6, in the case where the level of the objective pixel is x and the levels of the peripheral pixels at the upper position, left position and the upper oblique position are b, c, and a respectively, the change amount $\Delta r$ of the true value of the objective pixel and the predictive change amounts $\Delta i$ (i=0, 1, 2, 3) are obtained as the differences between the average values of the levels of the peripheral pixels and the level of the objective pixel. That is, $$\Delta r = (3x - a - b - c)$$

$$\Delta i = (3Ix - A - B - C)$$

where, A, B, and C denote levels which are obtained by decoding the digitization codes derived with respect to a, b, and c, respectively. The digitization code signal selected is the one in which $\Delta i$ is closest to $\Delta r$.

To obtain the space change amount, the predictive value obtained by the spatial prediction can be also used without being limited to the average value, that is, assuming that a predictive value is $x'$, then $$x' = b + \tfrac{1}{2}(c - a)$$

$$\Delta r = x - x' = x - b - \tfrac{1}{2}(c - a)$$

$$\Delta i = Ii - B - \tfrac{1}{2}(C - A)$$

In a manner similar to the above, the digitization code signal selected is the one whereby $\Delta i$ is closest to $\Delta r$.

Furthermore, the present invention can be applied to a digitizing circuit in other highly efficient coding such as ADRC of a variable length, ADRC of a three-dimensional block, etc.

When the first embodiment is applied to an image signal having a change as shown by a solid line 41 in FIG. 2, the data of the respective pixels are digitized producing the decoding representative value shown by □. The change of the reconstructed image results in a smooth change similar to the original signal as shown by a broken line 43. In this manner, according to the first embodiment, the spatial change of the original image signal can be preserved, so that the generation of visually conspicuous noises in the reconstructed image are prevented.

Now, a second embodiment of the present invention will be described with reference to the drawings.

Figure 7A:
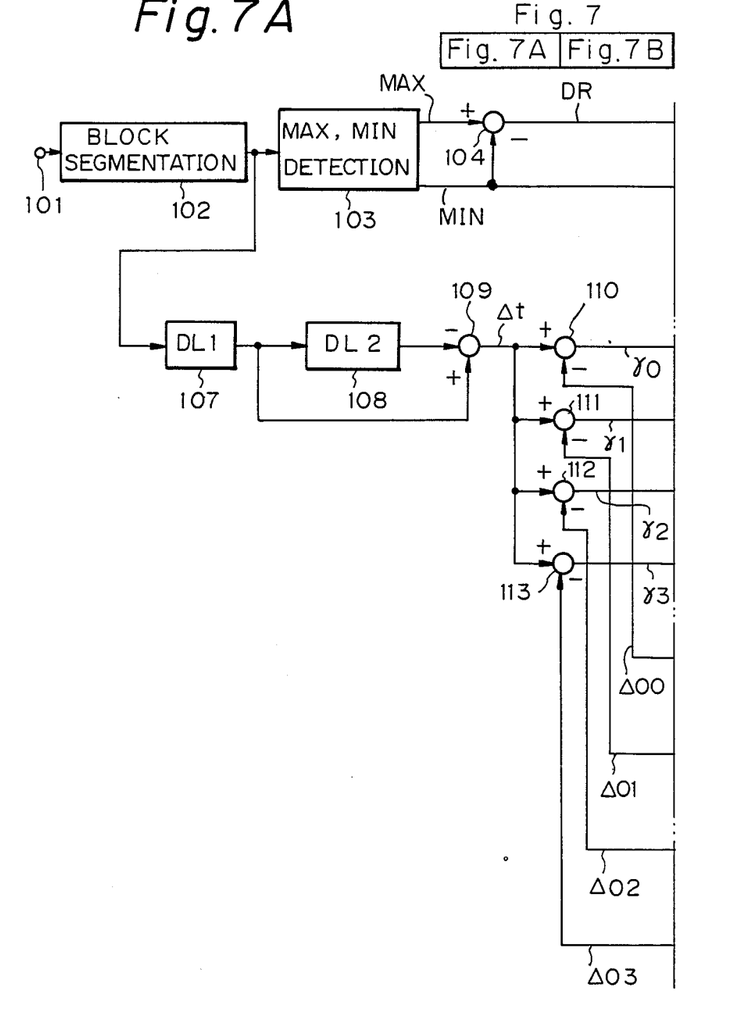
FIGS. 7A and 7B illustrate (FIG. 7) a block diagram showing a second embodiment of the present invention.
Figure 7B:
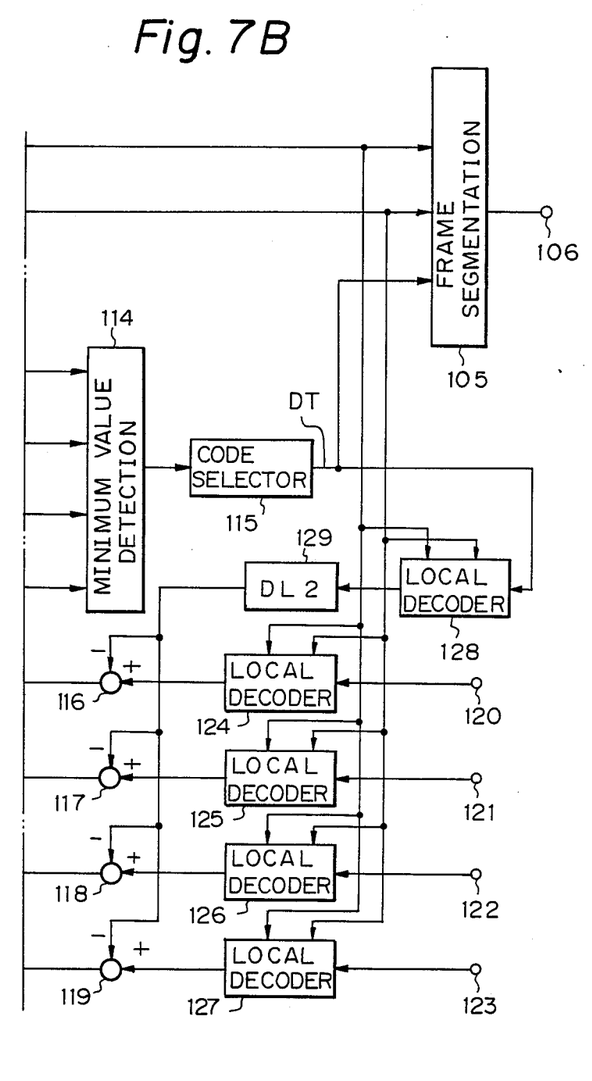

In FIGS. 7A and 7B, a digital video signal in which, for instance, one pixel (one sample) is digitized to eight bits and supplied to an input terminal shown by reference numeral 101. The data order of the input digital video signal is changed from scanning order to block order by a block segmentation circuit 102. Since a maximum value and minimum value detecting circuit 103, subtracting circuit 104 and frame segmentation circuit 105 having output terminal 106 have the same construction as circuits 3, 4 and 5 in FIG. 4, a detailed description of these is omitted.

The output signal of the block segmentation circuit 102 is supplied through delay circuits 107 and 108 to one input terminal of a subtracting circuit 109. A delay amount DL1 in delay circuit 107 corresponds to the time necessary to detect the maximum and minimum values in circuit 103. The output signal of the delay circuit 107 is supplied to the other input terminal of the subtracting circuit 109 whereby a difference $\Delta t$, in the time direction of the original pixel data (true value), is calculated. Assume that a true value of the objective pixel is set to x1 and a true value of a reference pixel which precedes the objective pixel by one frame period is set to x10, then ($\Delta t = x1 - x10$).

The difference $\Delta t$ between the true values of the image data from the subtracting circuit 109 is supplied to subtracting circuits 110, 111, 112, and 113. The output signals $\gamma 0$, $\gamma 1$, $\gamma 2$ and $\gamma 3$ from subtracting circuits 110, 111, 112 and 113, respectively are supplied to a minimum value detecting circuit 114 wherein a minimum output signal is detected. The detected signal from minimum value detection circuit 114 is supplied to a code selecting circuit 115 wherein a two bit digitization code DT is generated and transmitted to the frame segmentation circuit 105. In the code selecting circuit 115, one of the two-bit digitization codes (00), (01), (10) and (11), which corresponds to the decoding representative levels I0, I1, I2, and I3, is selected.

The selecting operation performed in code selecting circuit 115 is as follows.

When $\gamma 0$ is minimum, (00) is selected as the digitization code DT.

When $\gamma 1$ is minimum, (01) is selected as the digitization code DT.

When $\gamma 2$ is minimum, (10) is selected as the digitization code DT.

When $\gamma 3$ is minimum, (11) is selected as the digitization code DT.

Signals Δ00, Δ01, Δ02 and Δ03 are supplied from subtracting circuits 116, 117, 118 and 119 to subtracting circuits 110, 111, 112 and 113, respectively. The signals Δ00, Δ01, Δ02 and Δ03 correspond to the differences between the decoded level (X10) of the reference pixel and the four decoded representative levels and indicate the respective predictive change amount. The subtracting circuits 110, 111, 112 and 113 and the minimum value detecting circuit 114 detect among the signals Δ01, Δ02 and Δ03) the signal closest to the difference Δt in the time direction of the true value of the image data. In other words, a digitization code DT is selected which corresponds to the decoded representative level which generated a change closest to the signal change, in one frame period, of the original image signal with respect to the objective pixel.

Decoding representative levels (MIN+I0), (MIN+I1), (MIN+I2) and (MIN+I3), formed by the local decoders 124, 125, 126 and 127, are supplied to subtracting circuits 116, 117, 118 and 119, respectively. In order to generate these decoding representative levels, the dynamic range DR and the minimum value MIN are supplied to the local decoders 124, 125, 126, and 127 along with two bit digitization codes (00), (01), (10) and (11) supplied from terminals 120, 121, 122 and 123, respectively. The local decoders 124, 125, 126 and 127 and the local decoder 128 are comprised of ROMs to which the dynamic range DR and digitization code DT are supplied as addresses. The minimum value MIN is added to the data read out of the ROMs.

The decoding level Z10 of the reference pixel is formed by a local decoder 128 and a delay circuits 129 which has a delay DL2 equal to one frame period. Digitization data DT from the code selecting circuit 115 is supplied to local decoder 128 wherein a decoded level of the objective pixel is generated. By passing the decoded level through delay circuit 129, the decoded level x10 of the reference pixel is obtained.

The decoding level is supplied to the subtracting circuits 116, 117, 118 and 119. The signals Δ00, Δ1, Δ2 and Δ03 which are generated from the subtracting circuits 116, 117, 118 and 119, respectively, correspond to the predictive differences between the four decoded representative levels and the decoded level X10 of the preceding pixel as will be shown below.

$$\Delta 00 = (I0 + MIN) - X10$$

$$\Delta 01 = (I1 + MIN) - X10$$

$$\Delta 02 = (I2 + MIN) - X10$$

$$\Delta 03 = (I3 + MIN) - X10$$

In the subtracting circuits 110, 111, 112 and 113, the following output signals are formed.

$$\gamma 0 = \Delta t - \Delta 00$$

$$\gamma 1 = \Delta t - \Delta 01$$

$$\gamma 2 = \Delta t - \Delta 02$$

$$\gamma 3 = \Delta t - \Delta 03$$

The minimum signal among $\gamma 0$, $\gamma 1$, $\gamma 2$ and $\gamma 3$ is detected by the minimum value detecting circuit 114: The digitization code, in which the predictive change amount is closest to the true value of the change amount Δt, is selected by the code selecting circuit 115.

According to the second embodiment, time dependent change of the original image signal can be preserved so that the generation of visually conspicuous noises in the reconstructed image can be prevented.

According to the first embodiment spatial signal change can be preserved, however, the generation of the noises in the time direction cannot be prevented. On the other hand, according to the second embodiment the time dependent signal change can be preserved, but the generation of the spatial noises cannot be prevented. Moreover, a digitizing system in which such signal changes are significant has a problem whereby such errors are accumulated.

Therefore, in the third embodiment, a highly efficient coding apparatus which can be preferably adapted to characteristics such as pattern, movement amount of a picture, and the like of an image and which can improve the picture quality of the reconstructed image visually will be described hereinbelow with reference to FIG. 8.

Figures 8, 8A:
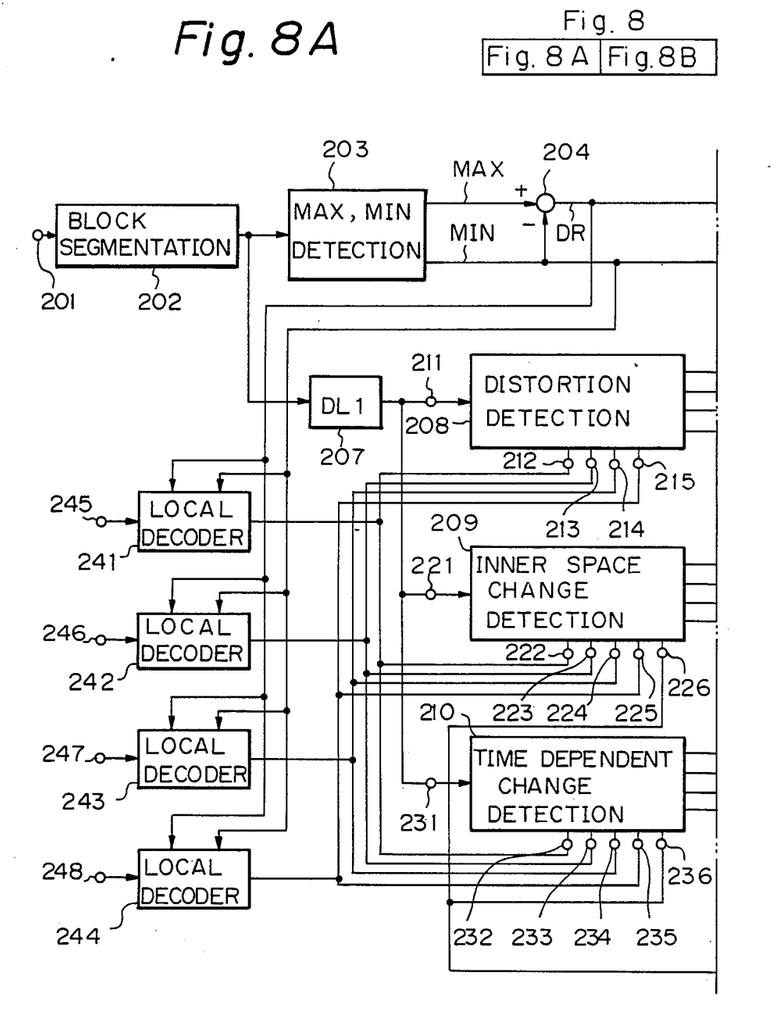
FIGS. 8A and 8B illustrate (FIG. 8) a block diagram showing a third embodiment of the present invention.
Figure 8B:
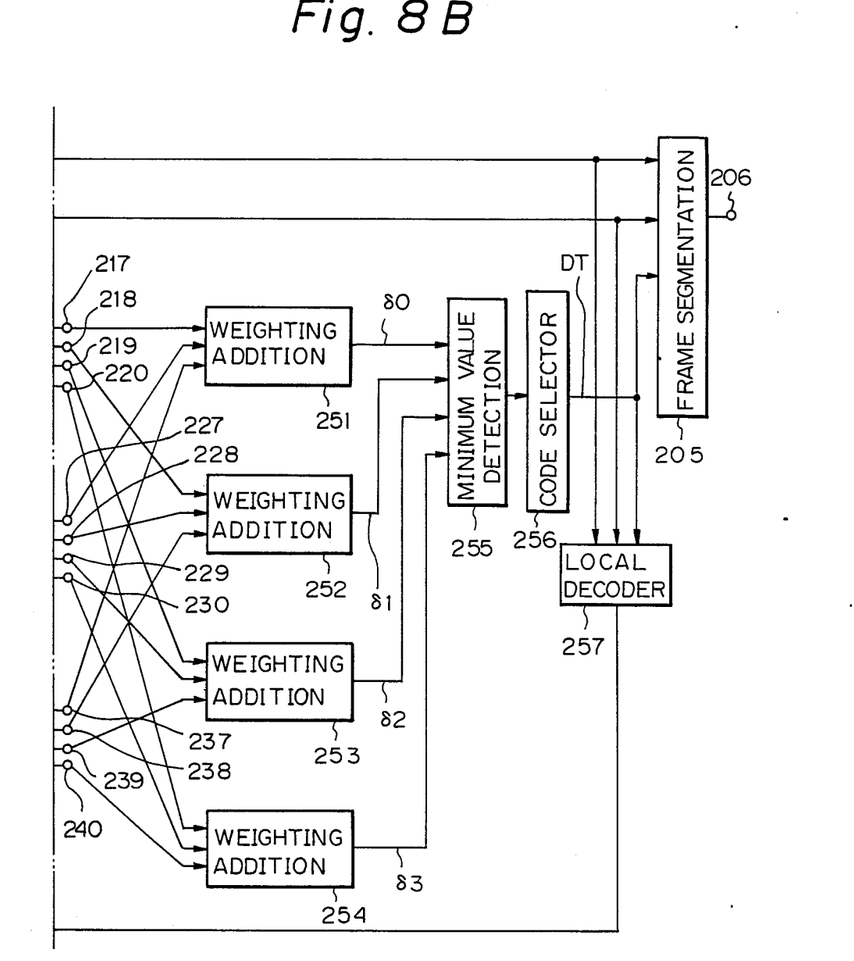

In FIG. 8, a digital video signal in which, for instance, one pixel (one sample) is digitized to eight bits and supplied to an input terminal shown by reference numeral 201. The data order of the input digital video signal is changed from the scanning order to block-order by a block segmentation circuit 202.

Since the circuits 203, 204 and 205 have the same construction as the circuits 3, 4 and 5 in FIG. 4, a detailed description of these is omitted.

The output signal of the block segmentation circuit 202 is supplied through delay circuit 207 to input terminals 211, 221 and 231 of a distortion detecting circuit 208, an inner space change detecting circuit 209, and a time dependent change detecting circuit 210, respectively. A delay amount DL1 in delay circuit 207 corresponds to the time necessary to detect the maximum and minimum values in circuit 203.

The distortion detecting circuit 208 is a first arithmetic operating circuit for calculating differences α0, α1, α2 and α3 between a true value x1 of the objective pixel and four decoded representative values corresponding to the number of bits. The decoded representative values are formed by local decoders 241, 242, 243 and 244. Digitization codes (00), (01), (10) and (11), each consisting of two bits, are supplied from terminals 245, 246, 247 and 248 to the local decoders 241 through 244, respectively. In addition, the dynamic range DR and the minimum value MIN are supplied to the local decoders 241 through 244. The distortion detecting circuit 208 has input terminals 212, 213, 214 and 215 to which the above decoding representative values are respectively supplied and output terminals 217, 218, 219 and 220 in which output signals α0, α1, α2 and α3 are respectively extracted.

The inner space change detecting circuit 209 is a second arithmetic operating circuit. Circuit 209 calculates a spatial first change amount Δr from the true value of the objective pixel and the true value of a peripheral pixel which is spatially located in the periphery. Circuits 209 also calculates spatial second change amounts Δ0, Δ1, Δ2 and Δ3 from the decoded value of the digitization code of the peripheral pixel and the decoding representative values; and calculates differences β0, β1, β2 and β3 between the first change amount Δr and the second change amounts Δ0, Δ1, Δ2 and Δ3. The inner space change detecting circuit 209 has input terminals 222, 223, 224 and 225 to which the above decoded representative values are respectively supplied, an input terminal 226 to which the decoded value of the digitization code DT is supplied, and output terminals 227, 228, 229 and 230 from which the differences β0, β1, β2 and β3 are extracted.

The decoded value of the digitization code DT is formed by a local decoder 257. The dynamic range DR, the minimum value MIN, and the digitization code DT are supplied to the local decoder 257 wherein the level corresponding to the digitization code DT is reconstructed by decoding the ADRC. The local decoders 241, 242, 243 and 244 and the local decoder 257 are comprised of ROMs to which the dynamic range DR and digitization code are supplied as addresses. The minimum value MIN from circuit 203 is added to the data read out of the ROMs.

The time dependent change detecting circuit 210 is the third arithmetic operating circuit calculates a time dependent third change amount Δt from the true value of the objective pixel and a true value of a reference pixel which preceded the objective pixel in time and spatially corresponds thereto. Circuit 210 also calculates time dependent fourth change amounts Δ00, Δ01, Δ02 and Δ03 from the decoded value of the digitization code of the reference pixel and the decoding representative values, and calculates differences γ0, γ1, γ2 and γ3 between the third change amount Δt and the fourth change amounts Δ00, Δ01, Δ02 and Δ03. The time dependent change detecting circuit 210 has input terminals 232, 233, 234 and 235 to which the above decoding representative values are respectively supplied, an input terminal 236 to which the decoded value of the digitization code is supplied, and output terminals 237, 238, 239 and 240 from which the output signals γ0, γ1, γ2, and γ3 are extracted.

Respective output signals of the distortion detecting circuit 208, inner space change detecting circuit 209, and time dependent change detecting circuit 210 are synthesized by weighting adding circuits 251, 252, 253 and 254. That is, the differential signals with respect to each of the four decoded representative values are weighted and added.

For instance, assume that w0, w1 and w2 denote weighting coefficients, then weighting adding circuit 251 generates a synthesized output δ0 which is expressed as follows:

$$w0\alpha0 + w1\beta0 + w2\gamma0 = \delta0$$

In a similar manner, weighting adding circuits 252, 253, and 254 generate synthesized outputs δ1, δ2 and δ3 which are expressed as follows:

$$w0\alpha1 + w1\beta1 + w2\gamma1 = \delta1$$

$$w0\alpha2 + w1\beta2 + w2\gamma2 = \delta2$$

$$w0\alpha3 + w1\beta3 + w2\gamma3 = \delta3$$

Fixed values or variable values may be used for the weighting coefficients w0, w1 and w2. These coefficients are determined by considering the characteristics of the input image or the like.

The synthesized outputs δ0 through δ3 from weighting adding circuits 251 through to 254 are supplied to a minimum value detecting circuits 255, in which a detection signal, indicative of the minimum signal of the synthesized outputs δ0 through to δ3, is generated. The detection signal is supplied to a code selecting circuit 256; which a two bit digitization code DT which is specified by the detection signal is generated. The digitization code DT is transmitted to the frame segmentation circuit 205. That is, in the code selecting circuit 256, one of the two-bit digitization codes (00), (01), (10) and (11), corresponding to the decoded representative levels I0, I1, I2 and I3, is selected.

The selecting operation of the code selecting circuit 256 is as follows.

When δ0 is minimum, (00) is selected as the digitization code DT.

When δ1 is minimum, (01) is selected as the digitization code DT.

When δ2 is minimum, (10) is selected as the digitization code DT.

When δ3 is minimum, (11) is selected as the digitization code DT.

Although not shown, on the reception side, the reception data is supplied to a frame desegmentation circuit and the dynamic range DR, the minimum value MIN, and the digitization code DT are separated by the frame desegmentation circuit. The dynamic range DR and the digitization code DT are supplied to the ROMs. The decoding level after the minimum value is eliminated is formed and the minimum value MIN is added to the decoding level. Further, the reconstruction levels obtained as the results of the addition are changed to the original scanning order by a block separating circuit.

As shown in FIG. 9, the distortion detecting circuit 208 comprises subtracting circuits 261, 262, 263 and 264. The true value x1 of the objective pixel is commonly supplied from the input terminal 211 to the subtracting circuits 261 through 264. The decoded representative levels (MIN+I0), (MIN+I1), (MIN+I2) and (MIN+I3) are supplied from the input terminals 212 through 215 to subtracting circuits 261 through 264, respectively. Therefore, the following output signals α0 through α3 are obtained at the output terminals 217 through 220 of the subtracting circuits 261 through 264, respectively.

$$\alpha0 = (I0 + MIN) - x1$$

$$\alpha1 = (I1 + MIN) - x1$$

$$\alpha2 = (I2 + MIN) - x1$$

$$\alpha3 = (I3 + MIN) - x1$$

The output signals α0 through α3 from the above distortion detecting circuit 208 indicate the differences between the true value x1 of the objective pixel and the decoded representative levels. The two-bit digitization code which corresponds to the minimum signal among α0 through α3 expresses x1 with a minimum distortion (that is, the best S/N ratio).

The inner space change detecting circuit 209 has a construction corresponding to that shown in FIG. 4. Similarly the construction of the time dependent change detecting circuit 210 corresponds to that shown in FIG. 7. Therefore, the detailed description of the circuits 209 and 210 is omitted.

The third embodiment is adapted to characteristics such as pattern, movement amount, and the like of the original image signal and improving the S/N ratio. The spatial change or time dependent change of the original image signal can be preserved, so that the generation of visually conspicuous noises in the reconstructed image can be prevented.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A highly efficient coding apparatus for encoding original digital video data having n bits for each picture element into compressed video data having a number of bits less than n for each picture element, comprising:
   first detecting means for detecting a first difference between an original digital value of a first picture element to be encoded and an original digital value of a spatially adjacent picture element of said first picture element;
   first local decoding means for decoding encoded video data of said spatially adjacent picture element to generate a first decoded value; and
   generating means for generating compressed encoded video data of said first picture element so that a difference between a decoded value of said compressed encoded video data and said first decoded value is closest to said first difference, said generating means including second local decoding means for decoding all compressed encoded data and for generating respective decoded values, first subtracting means for subtracting said first decoded value from each of said respective decoded values to generate first subtracted values, second subtracting means for subtracting each of said first subtracted values from said first difference to generate second subtracted values, minimum detecting means supplied with said second subtracted values for detecting a minimum value thereof and code selecting means for selecting compressed code data corresponding to the detected minimum value.

2. A highly efficient coding apparatus according to claim 1, wherein a plurality of picture elements are represented by said digital video data in the form of blocks of digital video data.

3. A highly efficient coding apparatus for encoding original digital video data having n bits for each picture element into compressed video data having a number of bits less than n for each picture element, comprising:
   first detecting means for detecting a first difference between an original value of a first picture element to be encoded and an original digital value of a temporally adjacent and spatially identical picture element of said first picture element;
   first local decoding means for decoding encoded video data of said temporally adjacent and spatially identical picture element to generate a first decoded value; and
   generating means for generating compressed encoded video data of said first picture element so that a difference between a decoded value of said compressed encoded video data and said first decoded value is closest to said first difference, said generating means including second local decoding means for decoding all said compressed encoded video data and for generating respective decoded values, first subtracting means for subtracting said first decoded value from each of said respective decoded values to generate first subtracted values, second subtracting means for subtracting each of said first subtracted values from said first difference to generate second subtracted values, minimum detecting means supplied with said second subtracted values for detecting a minimum value thereof and code selecting means for selecting compressed code data corresponding to the detected minimum value.

4. A highly efficient coding apparatus for encoding original digital video data having n bits for each picture element into compressed video data having a number of bits less than n for each picture element, comprising:
   first local decoding means for decoding all compressed code data and for generating decoded values for a first picture element to be encoded;
   first detecting means for detecting first differences between an original digital value of said first picture element and said each of said decoded values;
   second detecting means for detecting second differences between a difference value of the original digital value of said first picture element and an original digital value of a spatially adjacent picture element of said first picture element and difference values of said decoded values and a decoded value of an encoded data of said spatially adjacent picture element;
   third detecting means for detecting third differences between a difference value of the original digital value of said first picture element and an original digital value of a temporally adjacent and spatially identical picture element of said first picture element and difference values of said decoded values and a decoded value of an encoded data of said temporally adjacent and spatially identical picture element;
   weighting and adding means for multiplying first, second and third weighting coefficients by said first, second and third differences, respectively, and for adding corresponding ones of the multiplied first, second and third differences together to generate added values;
   minimum detecting means supplied with said added values for detecting a minimum value thereof; and
   code selecting means for selecting compressed code data corresponding to said minimum value.

5. A highly efficient coding apparatus for encoding original digital video data in the form of blocks of digital video data representing a plurality of picture elements having n bits for each picture element into compressed video data having a number of bits less than n for each picture element, comprising:
   first detecting means for detecting a first difference between an original digital value of a first picture element to be encoded and an original digital value of a spatially adjacent picture element of said first picture element;
   first local decoding means for decoding encoded video data of said spatially adjacent picture element to generate a first decoded value, said first local decoding means including first and second detecting means for detecting maximum and minimum values, respectively, of the digital video data representing the plurality of picture elements in each of said blocks, means for generating dynamic range information for each block of data from said maximum and minimum values for the respective block, read only memory means supplied with said encoded video data of said spatially adjacent picture element and the dynamic range information and for generating code data having n bits, and adder means for adding said code data and said minimum value to generate said first decoded value; and generating means for generating compressed encoded video data of said first picture element so that a difference between a decoded value of said compressed encoded video data and said first decoded value is closest to said first difference.

* * * * *